(12) United States Patent
Menoher

(10) Patent No.: US 8,516,580 B2
(45) Date of Patent: Aug. 20, 2013

(54) METHOD AND SYSTEM FOR PROCESSING A FILE TO IDENTIFY UNEXPECTED FILE TYPES

(75) Inventor: Jeffrey Menoher, Ridgefield, CT (US)

(73) Assignee: OWL Computing Technologies, Inc., Ridgefield, CT (US)

( * ) Notice: Subject to any disclaimer, the term of this patent is extended or adjusted under 35 U.S.C. 154(b) by 261 days.

(21) Appl. No.: 13/095,207

(22) Filed: Apr. 27, 2011

(65) Prior Publication Data

US 2012/0278884 A1 Nov. 1, 2012

(51) Int. Cl.
*H04L 29/06* (2006.01)
(52) U.S. Cl.
USPC .............. 726/22; 726/23; 726/24; 726/25; 726/26; 713/194; 706/46
(58) Field of Classification Search
USPC .......................................................... 726/22
See application file for complete search history.

(56) References Cited

U.S. PATENT DOCUMENTS 8,069,484 B2 * 11/2011 McMillan et al. .............. 726/23
2011/0099635 A1 * 4/2011 Silberman et al. ............. 726/24

OTHER PUBLICATIONS

Manna, Parbati Kumar, Sanjay Ranka and Shigang Chen. "DAWN: A Novel Strategy for Detecting ASCII Worms in Networks." IEEE INFOCOM 2008 proceedings.*
Claude E. Shannon, Prediction and Entropy of Printed English. Bell System Technical Journal, vol. 30, Issue 1, pp. 50-64, 1951.

* cited by examiner

*Primary Examiner* — Taghi Arani
*Assistant Examiner* — Narciso Victoria
(74) *Attorney, Agent, or Firm* — John S. Economou

(57) ABSTRACT

A method and system for testing a file (or packet) formed from a sequential series of information units, each information unit within a predetermined set of information units, e.g., each information unit may correspond to a character within the ASCII character set. An information unit-pair entropy density measurement is calculated for the received file using a probability matrix. The probability matrix tabulates the probabilities of occurrence for each possible sequential pair of information units of the predetermined set of information units. The computed information unit-pair entropy density measurement is compared with a threshold associated with an expected file type to determine whether the received file is of the expected file type or of an unexpected file type. The probability matrix may optionally be generated from the received file prior to calculating the density thereof. The probability matrix may optionally be predetermined based on the expected file type.

45 Claims, 9 Drawing Sheets

300

```
// accumulate char pair statistics
Initialize M [ ] [ ] to zero
For index i, from i=0 to i=N-2 {
j = A [i]
k = A [i+1]
M [j] [k] = M [j] [k] + 1
}
```
⎬ 310

```
// reduce to log-probability matrix
// for entropy measure
Initialize V [ ], P [ ] [ ], L [ ] [ ] to zero
For index j, from j=0 to j=127 {
For index k, from k=0 to k=127 {
V [j] = V [j] + M [j] [k]
}
For index k, from k=0 to k=127 {
P [j] [k] = M [j] [k] / V [j]
L [j] [k] = -Ln ( P [j] [k] )
}
}
```
⎬ 320

```
// measure cumulative entropy
Initialize S to zero
For index i, from i=0 to i=N-2 {
j = A [i]
k = A [i+1]
S = S + L [j] [k]
}
```
⎬ 410

```
// calculate entropy density
D = S / (N-1)
```
⎬ 420

FIG. 4

METHOD AND SYSTEM FOR PROCESSING A FILE TO IDENTIFY UNEXPECTED FILE TYPES

FIELD OF INVENTION

This invention relates generally to a method and system for processing a computer file to verify that the file is of an expected file type.

BACKGROUND OF THE INVENTION

Information rendered digitally as ASCII characters usually contains high levels of redundancy. Examples demonstrating such redundancy include measurements of entropy in the English language by Claude Shannon and others that indicate that each 7-bit ASCII character carries roughly one bit of information. (See, e.g., Claude E. Shannon, Prediction And Entropy Of Printed English. Bell System Technical Journal, pp. 50-64, 1951). One manifestation of this redundancy is the tendency of certain ASCII characters to follow others in specific sequences. These tendencies are measurable in all forms of highly structured ASCII data files, including XML or spreadsheet data rendered as ASCII characters in an ASCII data file.

When binary data is rendered as ASCII characters, there is an increase of apparent randomness among the characters. Example methods of rendering binary data as a string of 7-bit ASCII characters include Base64 and UUIC encoding. Another example of binary data which may be rendered as ASCII characters within is malicious executable code, or malware. Malware can be a computer virus, worm, Trojan horse, spyware, adware, etc. Ordinarily, malware is hidden within executable files. It is customary, when data is transferred from one network domain to another, to scan the data for executable malware because such malware could threaten the integrity of data in the destination network. File types with complex binary formats, such as Microsoft Office documents and PDF files, are considered high risk formats because of the many methods available to embed executable code that may be malicious within files in such formats.

Files containing only 7-bit ASCII content are considered low risk, because the content can easily be constrained to specific formats that may be verified with data filtering software. For this reason, ASCII text files are widely used to transfer information in high-security environments. However, in certain cases malware may be hidden within an ASCII data file. For example, it is possible to embed executable code in 7-bit ASCII using encoding methods such as base64 or UUencode, as is routinely done to attach binary files to emails. Before invocation, the coded executable must be decoded back to its native form. While encoded executable code cannot be invoked directly in encoded form, it still presents a threat to be mitigated in high security environments. In such environments, embedded binary code must first be detected before it is removed or quarantined.

If the ASCII file is highly structured, it is possible to write a data filter to parse the characters into defined fields whose string contents conform to acceptable rules. Such filters are known to provide a high level of security, but are also complicated and tend to be difficult to configure and maintain.

As a result, it is desirable to have a method and system for identifying binary data rendered as ASCII characters within an ASCII file to assist in the identification of and protection from malware hidden as binary data within the file.

SUMMARY OF THE INVENTION

The present invention provides a method and system for identifying binary data rendered as characters (or bytes or other information units) within a particular file, or a packet among a group of packets forming a particular file, based upon character-pair statistics. In particular, a file to be tested is received which is formed from a sequential series of information units, each information unit within the file included within a predetermined set of information units. An information unit-pair entropy density measurement is calculated for the received file using a probability matrix. The probability matrix tabulates the probabilities of occurrence for each possible sequential pair of information units of the predetermined set of information units. Next, the computed information unit-pair entropy density measurement is compared with a threshold associated with an expected file type and it is determined whether the received file is of an unexpected file type or of the expected file type.

In one embodiment, the probability matrix is generated from the received file prior to computing the first information unit-pair entropy density measurement. In another embodiment, the probability matrix is predetermined based on the first expected file type.

Optionally, if the received file is determined to be of an unexpected file type, a second information unit-pair entropy density measurement may be computed for the received file using a second probability matrix. The second computed information unit-pair entropy density measurement is compared with a threshold associated with a second expected file type and then it is determined whether the received file is of an unexpected file type or of the second expected file type.

In a further embodiment, an information unit-pair entropy density measurement is computed for each of a plurality of subdomains of the received file and each information unit-pair entropy density measurement is compared to the threshold to determine whether the received file includes one or more subdomains corresponding to an unexpected file type.

BRIEF DESCRIPTION OF THE DRAWINGS

The following detailed description, given by way of example and not intended to limit the present invention solely thereto, will best be understood in conjunction with the accompanying drawings in which:

FIG. 3 is a pseudo code listing of a method for forming a log-probability matrix for use in an embodiment of the present invention;

FIG. 4 is a pseudo code listing of a method for calculating the entropy density of an ASCII file for use in an embodiment of the present invention;

DETAILED DESCRIPTION OF THE PREFERRED EMBODIMENT

Figure 1:
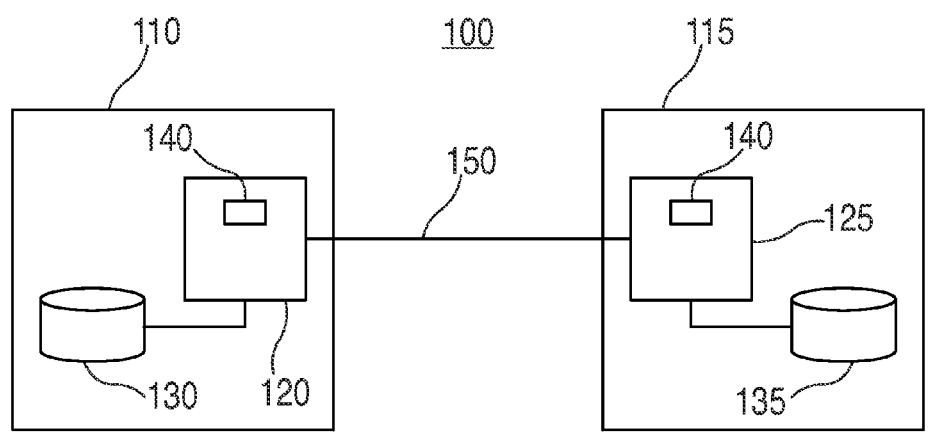
FIG. 1 is a block diagram illustrating a high level overview of a system for practicing embodiments of the present invention.

Referring now to the drawings and in particular to FIG. 1, a computer system 100 consists of a first computer network 110 coupled to a second computer network 115 via a network connection 150. Network connection 150 may be direct, as shown in FIG. 1, or may be indirect, e.g., through intermediate computer networks such as when connecting two computer networks via the Internet. The first computer network 110 includes at least one computing system 120 and at least one file storage device 130, which may be separate from the computing system 120 as shown in FIG. 1 or may be integral to the computing system, e.g., a hard disk within a personal computer. Similarly, in a similar manner the second computer network 115 includes at least one computing system 125 and at least one file storage device 135. It is common to transfer files from one network to another, including ASCII text files as discussed above in the Background of the Invention section. The present invention provides a data filter 140 used to analyze such files in accordance with the method discussed below. Data filter 140 may be provided in each computing system 120, 125 as shown in FIG. 1 or may be provided in only one of the computing systems 120, 125. Data filter 140 may be configured to analyze only files to be transmitted from the associated local network, to analyze only files received from a remote network, or to analyze both files to be transmitted from the associated local network and files received from a remote network.

Figure 2:
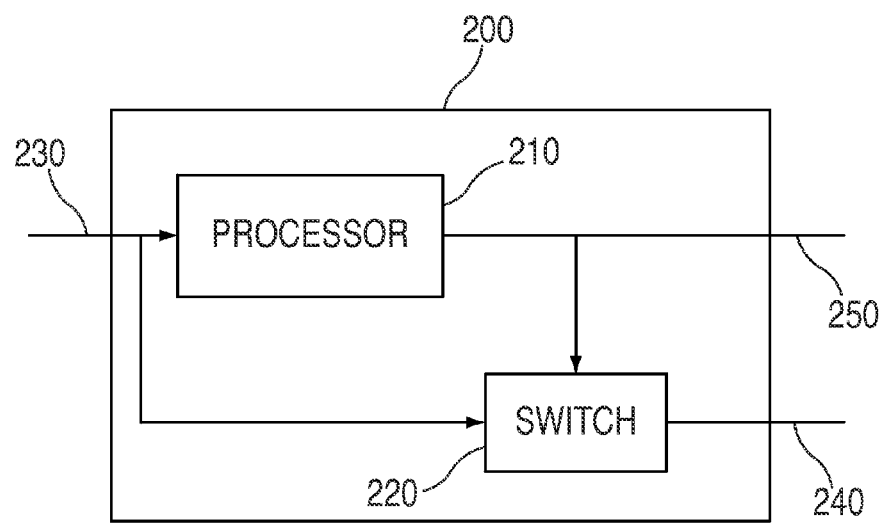
FIG. 2 is a block diagram illustrating an embodiment of the present invention.

As shown in FIG. 2, data filter 200 may include a processor 210 which analyzes an ASCII data file provided on an input 230 in accordance with the methods described below and can generate a output signal 250 indicating that the received ASCII file does not conform to expected results for that file type, e.g., that such ASCII data file includes embedded binary code. Optionally, data filter 200 may also include a switch 220 (hardware or software) which operates under the control of output signal 250 which prevents the ASCII file from being further transmitted when output signal 250 is asserted.

As one of ordinary skill in the art will readily recognize, computing system 120 and computing system 125 may be any specific type of computer systems and/or intelligent electronic devices, such as a desktop, laptop, or palmtop computer systems, and/or personal digital assistants, cell phones, or other electronic devices. In addition, one of ordinary skill in the art will also readily recognize that data filter 140 may be embodied using software or firmware, such as computer application program code, operating system program code, or middleware, and/or wholly or partly using digital hardware components, such as application specific integrated circuits (ASICs), field-programmable gate arrays (FPGAs), and the like, and/or combinations of hardware and/or software or firmware. Further, one of ordinary skill in the art will further recognize that computing system 120 and computing system 125 may each include one or more processors, and program and data storage, such as memory, for storing program code executable on such processors, as well as various input/output devices and/or interfaces.

The present invention, as embodied in processor 210 in FIG. 2, exploits the non-randomness of the order of the ASCII characters in an ASCII file in any structured language having a fixed character set, e.g., English. In ASCII files in such structured languages, certain sequential character pairs are more likely to occur than others as opposed to an ASCII file containing ASCII-encoded binary data which the sequential character pairs occur more randomly. In particular, the present invention employs a character-pair entropy model in data filter 140 to analyze the data within an ASCII file. As one of ordinary skill in the art will readily recognize, the present invention may also be applied to a file in any structured language having a fixed set of elements (information units), using the same techniques discussed herein.

The character-pair entropy model is based on the fact that a particular character $C_i$ (i.e., the character C at byte location i) within an ASCII data file can have a decimal value that ranges from 0 to 127 (00 to 7F in hexadecimal) for the full ASCII character set, i.e., $C_i$ may have 128 discrete different values or $0 \leq C_i \leq 127$. As discussed below, when considering only the printable ASCII character set, the character set is limited to only 100 discrete different values. By assigning j and k as the values of sequential characters C within the ASCII file being processed (i.e., $j=C_i$ and $k=C_{i+1}$), a probability matrix $P_{jk}$ can be constructed with the indices of the matrix corresponding to the values of a sequential pair of ASCII characters as follows:

$$P_{jk}=Pr\{\text{char value j followed by char value k}\} \quad (1)$$

This probability matrix $P_{jk}$ of equation (1) has 128 rows and 128 columns, corresponding to each of the possible values for a character C within the ASCII character set. The probability values for the matrix $P_{jk}$ may be determined experimentally, as described in further detail below.

An ASCII file consists of N bytes of sequentially-ordered ASCII characters. Each sequentially-ordered pair of characters has an associated probability of occurrence. For the entire file, a joint probability of the sequential pairs of characters can be calculated as follows:

$$Pr_{joint}\{\text{all char pairs in file}\} = \prod_{i=0}^{i<N-1} P_{i,i+1} \quad (2)$$

An entropy measure S of the file can be created based upon the negative exponent of the joint probability $Pr_{joint}$ calculated in equation (2) as follows:

$$S=-\ln(Pr_{joint}\{\text{all char pairs in file}\}) \quad (3a)$$

$$S = -\ln\left(\prod_{i=0}^{i<N-1} P_{i,i+1}\right) = -\sum_{i=0}^{i<N-1} \ln(P_{i,i+1}) \quad (3b)$$

The calculation of entropy measure S in equation (3b) provides a number of advantageous features. A log-probability matrix $L_{jk}$ can be generated for use as a look-up table in which $L_{jk}$ is calculated from the probability matrix $P_{jk}$ as $L_{jk}=-\ln(P_{j,k})$, negating the need to repeatedly perform the log operation when calculating S. The entropy measure S can then be calculated as a simple summation of pre-calculated values obtained from the look-up table and can be rendered in software that executes quickly.

Since the underlying joint probability is likely to be a positive number that is much smaller than one, the entropy measure S is likely to produce a number of reasonable size that is easy to subject to further numerical tests. Thus the entropy measure S magnifies the difference between files containing random sequences of ASCII characters and files containing higher level structures rendered in ASCII characters.

For a file having a random sequence of 7-bit ASCII characters (over the entire set of 128 different ASCII characters), the probability for a given ASCII character to follow another is the same for each character:

$$P_{random} \approx 1/128 = 2^{-7} = \text{constant} \qquad (4)$$

Applying this random probability value calculated in equation (4) to the entropy measure S yields the following results:

$$S_{random}(N) = 7 * \sum_{i=0}^{i<N-1} \ln(2) \approx 7 * N * \ln(2) \approx N * 4.85 \qquad (5)$$

Note that the entropy measure $S_{random}$ calculated in equation (5) above scales linearly with N and provides an upper bound for expected measures of random sequences of ASCII characters. For structured ASCII data where character pair probabilities are not uniform, entropy measures are lower.

For the smaller set which includes only printable ASCII characters, all character values below 32 are disallowed except for 9, 10, 11, 12, and 13 (tab through carriage return, respectively). Character 127 (delete) is also disallowed. This reduces the number of allowed characters from 128 to 100. For this smaller set of printable ASCII characters, a revised random probability value can be calculated:

$$P_{random} \approx 1/100 = 10^{-2} = \text{constant} \qquad (6)$$

Applying this random probability value of equation (6) to the entropy measure S yields the following results:

$$S_{random}(N) = 2 * \sum_{i=0}^{i<N-1} \ln(10) \approx N * 2 * \ln(10) \approx N * 4.61 \qquad (7)$$

The linear dependence of entropy measure S in equations (5) and (7) on N suggests that the entropy measure for 7-bit ASCII strings may be scaled and rendered independent of N to generate an entropy density measure D as follows:

$$D = S/N = -(1/N) \sum_{i=0}^{i<N-1} \ln(P_{i,i+1}) \qquad (8)$$

The entropy density measure D for random 7-bit ASCII character files is a constant, since N appears in the numerator and denominator. Thus, for the full set of 7-bit ASCII characters:

$$D_{random} = S_{random}/N \approx N * 4.85/N = 4.85 \qquad (9)$$

Similarly, for the smaller set of printable ASCII characters:

$$D_{random} = S_{random}/N \approx N * 4.61/N = 4.61 \qquad (10)$$

The formulas above suggest that various strings of ASCII characters may be measured to determine their entropy densities, which may be compared to determine their degree of randomness. ASCII encoded binary data should appear random, and should present entropy density measures near to but less than 4.85, whereas English text rendered as ASCII characters in a file should present an entropy density value significantly lower. As a result, a threshold value may be empirically determined and used for testing purposes to identify encoded binary data with an ASCII data file.

The probability matrix may be determined empirically from a large representative sample of ASCII data. The sample data set must be large enough to be statistically meaningful. A sample ASCII data set of 500 Kbyte provides roughly 32 samples for each element of the probability matrix, which is likely to be sufficient. The data should be representative of the actual file formats to be filtered. Examples of various ASCII text formats include HTML (hyperlinked documents), XML, and CSV (spreadsheets rendered as comma separated values).

A lengthy sample string A of N 7-bit ASCII characters has an index i which ranges from 0 to N−1 is used to determine the probability matrix. First, a matrix $M_{j,k}$ representing the frequency of character pair occurrences in the sample string A is created where indices j, k represent a particular sequential combination of ASCII character values and the matrix element values represents the total number of instances of a particular character pair within the sample data set A. Next, a vector $V_j$ is created where the index j represents a particular ASCII character and having an element value representing the number of occurrences of character pairs whose leading character is character j. $V_j$ is closely approximated by the total number of occurrences of character j in data set A. Based on the foregoing, the probability matrix $P_{j,k}$ can be calculated according to the following equation:

$$P_{j,k} = \frac{M_{j,k}}{V_j} \qquad (11)$$

From this, the log-probability matrix can be calculated for use as a look-up table in the data filter of the present invention as follows:

$$L_{j,k} = -\ln(P_{j,k}) \qquad (12)$$

The method for calculating the probability matrix $P_{j,k}$ and log-probability matrix $L_{j,k}$ from ASCII sample data is shown rendered in pseudo code 300 in FIG. 3. In the first step 310, the character pair statistics are calculated by processing the array A[i] and summing the number of occurrences of each character pair in the matrix M[j][k]. Then, the vector V[i] is determined at step 320, the probability matrix P[j][k] is calculated at step 330 and finally, at step 340, the log-probability matrix L[j][k] is calculated for use as a look-up table as discussed herein. At step 330, as discussed below in more detail, as one of ordinary skill in the art will readily recognize, minor adjustment of the calculated values may be necessary to avoid divide-by-zero errors.

Once the log-probability matrix is determined from sample data, the entropy density measurement method discussed above may be applied to any string of 7-bit ASCII characters. As shown in in the pseudo code 400 of FIG. 4, the entropy S of a string A[i] having N characters is first measured at step 410 by summing the log-probability of each sequential pair in the string, corresponding to equation (3b) above. Then, the entropy density D of the string A[i] is calculated at step 420, corresponding to equation (8) above. The entropy density D may be calculated for the entire string (i.e., from i=0 to i=N−2), or may be calculated for a subset of the string by adjusting the initial and final value of i in FIG. 4 to select only the desired subset of the string. For example, it may be desirable to measure the entropy density D for only particular regions of the string, e.g., known regions more likely to contain embedded binary code. It may also be desirable to measure the entropy density D in sequential subdomains of the string, as discussed in more detail below with respect to FIG. 6.

The foregoing methods were rendered in an entropy measurement program in C code for testing, compiled using the Gnu open-source compiler, and executed in the CYGWIN environment on a Dell laptop computer. The entropy measurement program calculates the log-probability matrix based L[j][k] on all character pairs in a particular file and then calculates the entropy density D of the file. The entropy measurement program was used to test files containing only random 7-bit ASCII characters, i.e., ASCII text files containing English-literature content (obtained the Gutenberg project at website www.gutenberg.org) and a KML file (obtained from the website of the town of Mesquite, Tex.). The results of this testing are shown in Table 1. In each case, the log-probability matrix was constructed from the same file for which the entropy density was calculated.

TABLE 1

| Content | Type | Length | Entropy Density |
|---|---|---|---|
| Random Characters | Text | 5.0 MByte | 4.85 |
| Random Printable Characters | Text | 5.0 MByte | 4.60 |
| Base64 Encoded MPEG file | Text | 19 MByte | 4.04 |
| UU Encoded MPEG File | Text | 19 MByte | 4.00 |
| James Joyce, Ulysses | Text | 5.6 Mbyte | 2.50 |
| Shakespeare, All Works | Text | 5.6 Mbyte | 2.42 |
| Street Map, Mesquite, TX | KML | 4.4 Mbyte | 1.31 |

As evident in Table 1, the entropy density values for ASCII files with random characters agree perfectly with the theoretical predictions discussed above. In particular, the four tested files having random data (i.e., the first four entries in Table 1) all have density values of 4.0 or greater, while the three highly structured ASCII files (i.e., the last three entries in Table 1) have density values of 2.50 or less. A general trend towards lower entropy density values for files containing highly structured (i.e., non-random) ASCII content is thus evident. These results suggest that an approximate numerical threshold value 3.2 may be used to distinguish files having highly-structured ASCII text from files having random text (e.g., files consisting of embedded executable code).

Figure 5A:
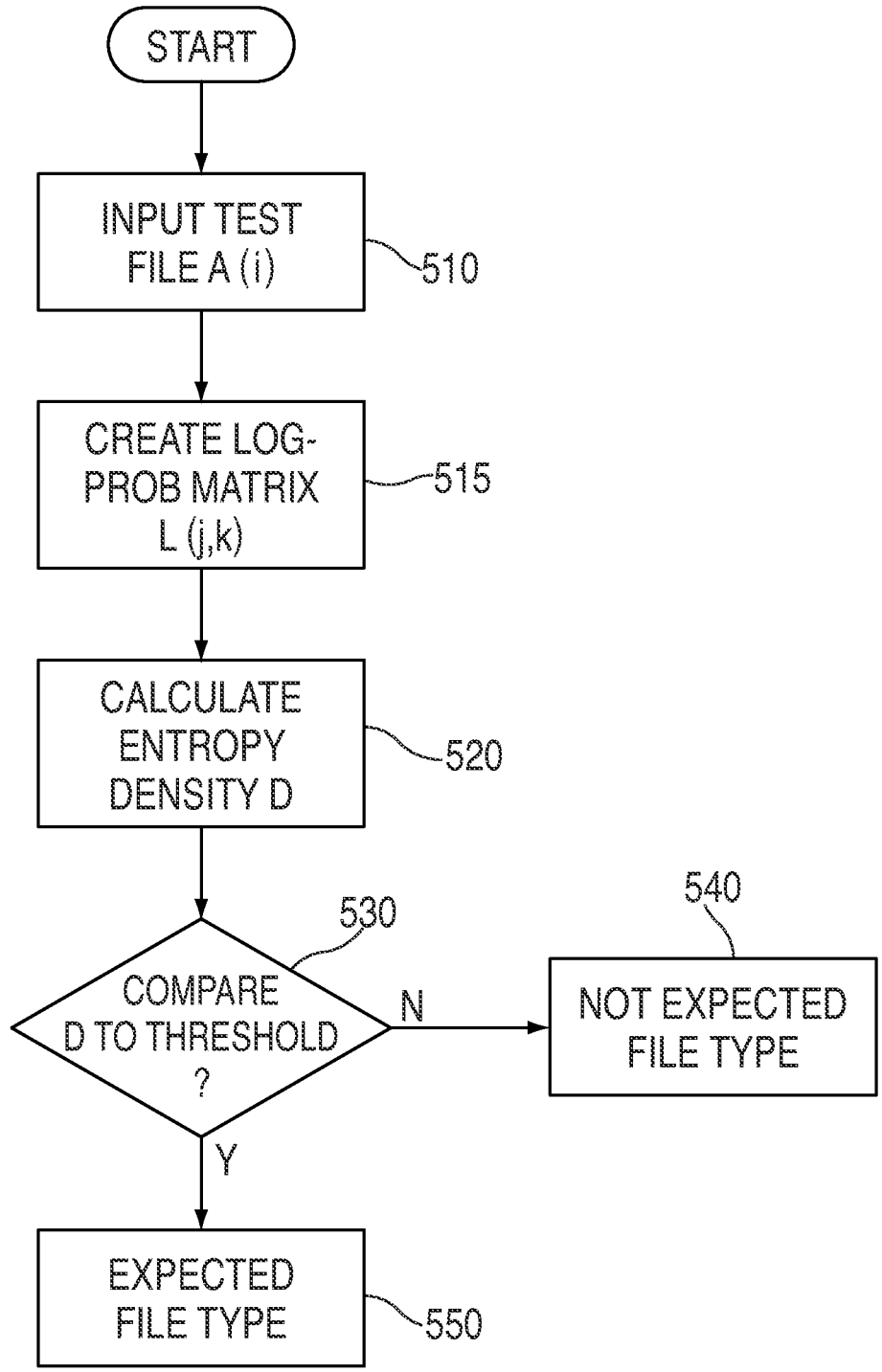
FIGS. 5A, 5B and 5C are flowcharts illustrating embodiments of the present invention.

For each empirical measurement example presented in Table 1, the log-probability matrix L was calculated from the file to be tested and then applied to the same file to produce the entropy density measurement D. In this method of operation, as shown in FIG. 5A, a test file A(i) is first input at step 510, the log-probability matrix is L(j,k) is calculated at step 520, the entropy density D of A(i) is calculated at step 530 using the calculated log-probability matrix L(j,k). The calculated entropy density D is then compared to an expected threshold at step 530. If the comparison shows that the calculated entropy density is below the expected threshold, e.g., a value 3.2 when distinguishing highly-structured ASCII text from files having random characters, the comparison identifies an expected file type at step 550. If the comparison shows that the calculated entropy density is not below the expected threshold, the comparison identifies an unexpected file type at step 540.

Figure 5B:
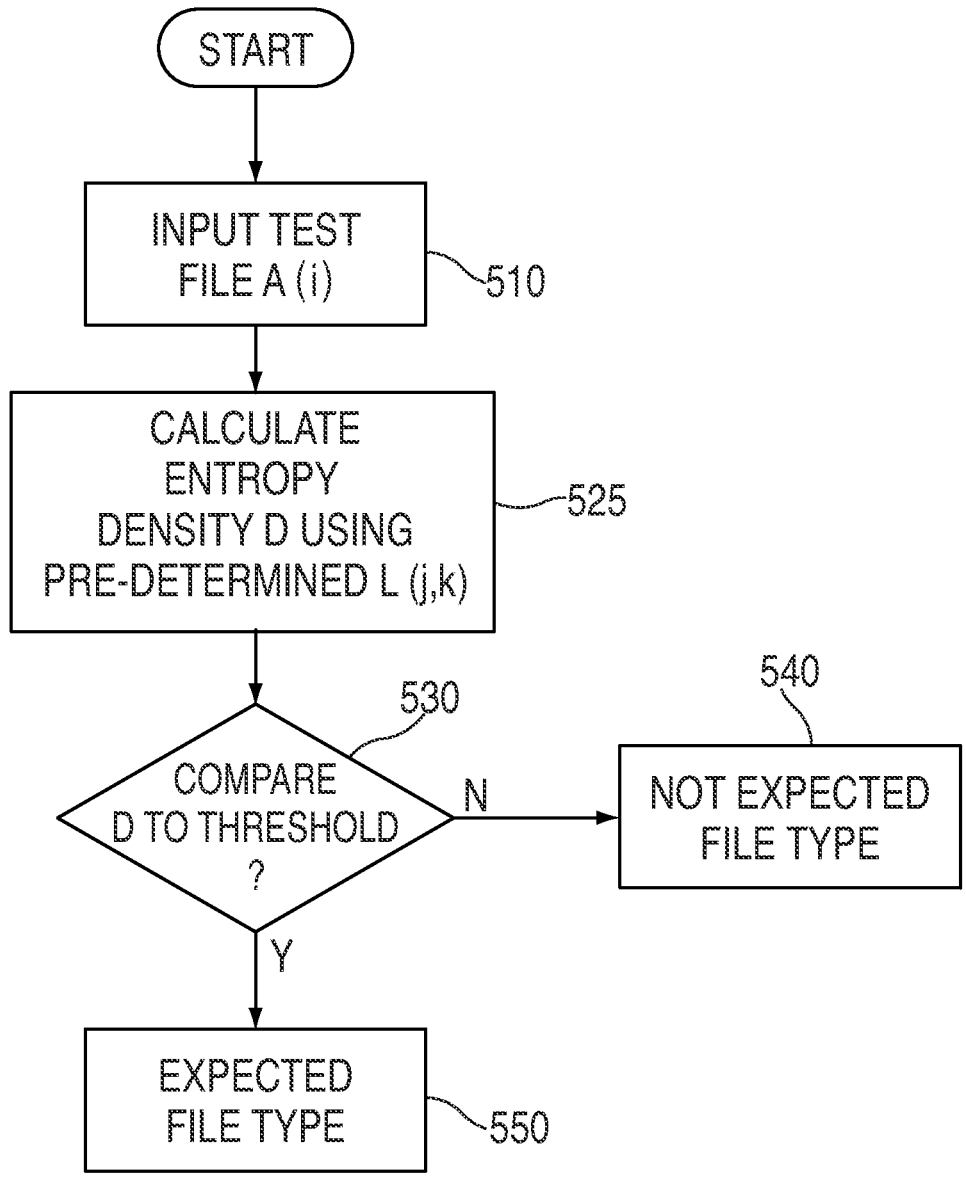

It is also possible to calculate a log-probability matrix L from one file (i.e., a reference file) and then use such matrix to calculate the entropy density value D of another file (the test subject). If the content structure in the test subject file is very different from the reference file, the measured entropy will be larger than for the reference file. This method is shown in FIG. 5B (the same reference numbers are used in FIG. 5B for steps which have not changed from the method of FIG. 5A), where the test file A(i) is first input at step 510, the entropy density D of A(i) is calculated at step 525 using a reference (pre-calculated) log-probability matrix L(j,k). The calculated entropy density D is then compared to an expected threshold at step 530. If the comparison shows that the calculated entropy density is below the expected threshold, e.g., a value 5 as discussed further with respect to Table 2, the comparison identifies an expected file type (i.e., the type of file used to generate the reference log-probability matrix) at step 550. If the comparison shows that the calculated entropy density is not below the expected threshold, the comparison identifies an unexpected file type (i.e., a file type different from the type of file used to generate the reference log-probability matrix) at step 540.

Figure 5C:
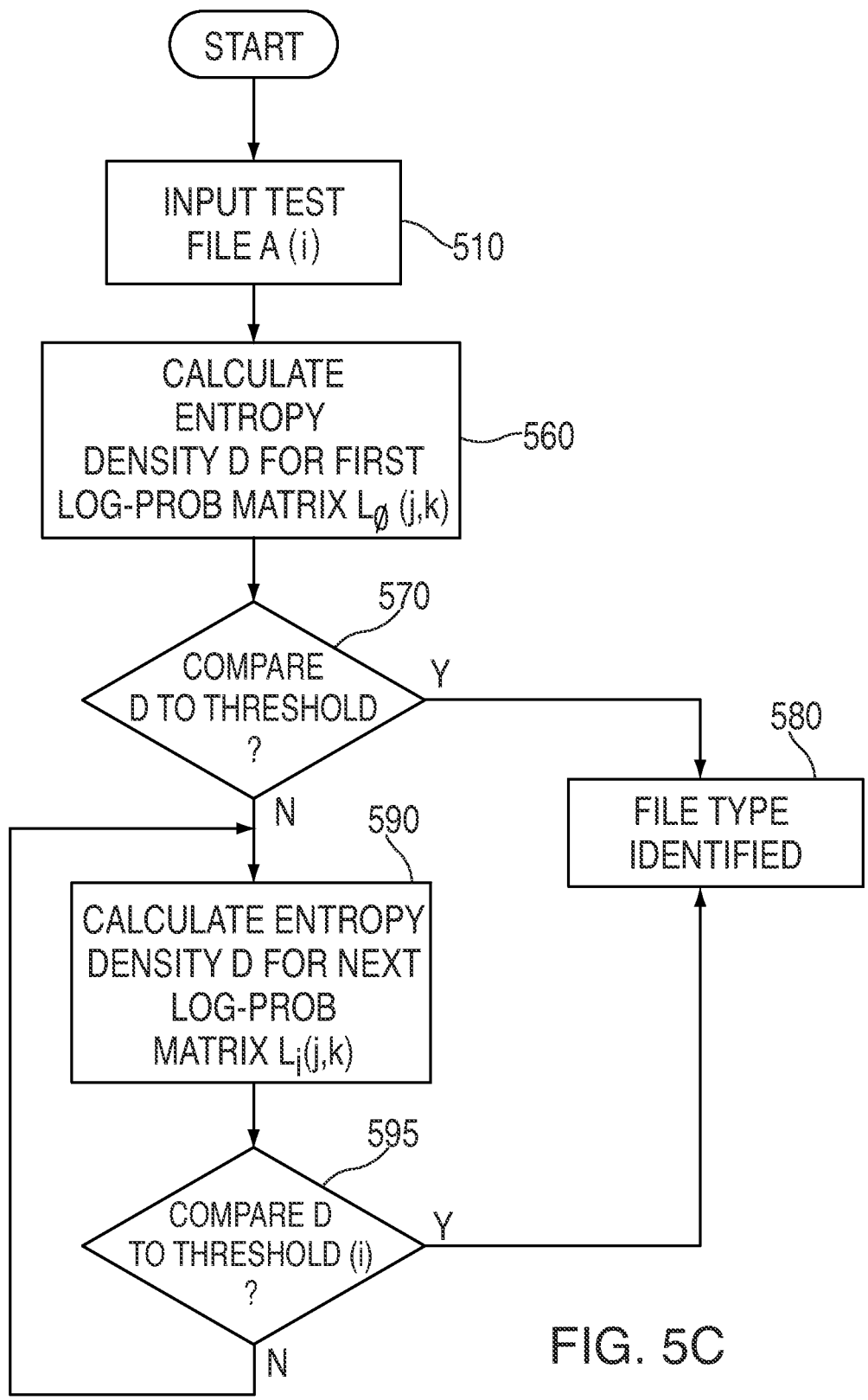

Log-probability matrix L may be used for recognition of specific file format types. Log-probability matrix L will represent different probability distributions depending on whether the file contains English text, HTML coding, KML coding, or some other structured format. If multiple versions of log-probability matrix L are available, each generated from different reference file types, the entropy density of a given file may be measured against each different version of log-probability matrix L, and the entropy values compared. The log-probability matrix L producing the lowest entropy measure indicates the best match between a given file type and the reference file type. This method is shown in FIG. 5C (the same reference numbers are used in FIG. 5C for steps which have not changed from the method of FIG. 5A), where the test file A(i) is first input at step 510, the entropy density D of A(i) is calculated at step 560 using a first reference (pre-calculated) log-probability matrix $L_0(j,k)$. The calculated entropy density D is then compared to the expected threshold at step 570. If the comparison shows that the calculated entropy density is equal to the expected threshold for the first reference log-probability matrix $L_0(j,k)$, the comparison identifies an expected file type (i.e., the type of file used to generate the reference log-probability matrix) at step 580. If the comparison shows that the calculated entropy density does not match the expected threshold, the entropy density D of A(i) is again calculated using the next reference log-probability matrix $L_i(j,k)$ at step 590, and the calculated entropy density D is compared to the expected threshold for the next reference log-probability matrix $L_i(j,k)$ at step 595. If the calculated entropy density D matches the expected threshold, the file type matches the file type used to generate the associated reference log-probability matrix $L_i(j,k)$ (step 580). If there is no match at step 595, then processing loops back to step 590, so long as there are additional reference log-probability matrices for testing and/or until a match if found.

As discussed above with respect to step 330 in FIG. 3, when the log-probability matrix L of one file type is used to measure the entropy of another file, some care must be taken to adjust numerical values of the log-probability matrix L to compensate for the infrequent occurrence of some character pairs. Since the log-probability matrix L is determined empirically, it is possible to measure zero probabilities for character pairs that are not encountered in a given sample data set, which result in unbounded entropy values. Under these conditions, all matrix index locations whose probability values are zero may be replaced with a single probability estimate based on the assumption that such character pairs would have been found just beyond the bounds of the sample data set. This probability is closely approximated by the inverse of the total number of characters in the data sample set. After this substitution, the values of all probabilities on each row of the probability matrix are scaled so they sum to unity. After scaling, the logarithm is calculated on each entry within the matrix. As one of ordinary skill in the art will readily recognize, there are numerous other ways to adjust the numerical values of the log-probability matrix to avoid divide-by-zero errors and still maintain accurate results.

In addition, when the log-probability matrix L of one file type is used to measure the entropy density D of another file type, the entropy density measurements often exceed those characteristic of random numbers. This is expected because the log-probability matrix L of the reference file is "tuned" to expect specific combinations of characters, thus magnifying the effect of improbable character combinations found in files of a different format.

The methods described above were rendered in software programs written in C code, compiled using the Gnu open-source compiler, and executed in the CYGWIN environment on a Dell laptop computer. The four sample data files identified in Table 1 above were used to perform relative tests of entropy density, and empirical examples of relative entropy density measurements among the four file types are presented in Table 2 below. In each case, the log-probability matrix L was constructed from the reference file type identified in the first column, and that particular log-probability matrix L was used to calculate the entropy density of each file listed in columns two through five As evident in Table 2, the self-measurements of entropy density, i.e., where the log-probability matrix L of a particular file type is used to calculate its own entropy density, match the empirical results in Table 1, even though the log-probability matrix L was adjusted to provide non-zero probabilities for all character pairs. Based on the results shown in Table 2, an "identity match" threshold may be approximated for this particular group of file types by an entropy density numerical value of 5, i.e., if the entropy density measurement is 5 or less, the file tested matches the file type of the reference file.

TABLE 2

| Reference File | KML | Shakespeare | UU Encoded | Base64 |
| --- | --- | --- | --- | --- |
| KML | 1.31 | 15.7 | 15.4 | 19.1 |
| Shakespeare | 6.03 | 2.42 | 17.7 | 17.9 |
| UU Encoded | 10.9 | 13.3 | 3.97 | 12.4 |
| Base64 | 11.3 | 12.2 | 11.1 | 4.04 |

The foregoing data filtering method may be similarly applied to a broader variety of reference files types to allow for the identification of such file types. In addition, the foregoing method may be used to identify character sequences greater than two and for use with long word character sets, e.g., structured character sets used in languages other than English or non-language files and/or packets formed from bytes selected from a fixed set of possible byte values. In particular, as one of ordinary skill in the art will readily recognize, the present invention may be used to process any fixed set of data consisting of a plurality of information units (e.g., characters or words) where the information units fall within a predetermined set of information units.

Figure 6:
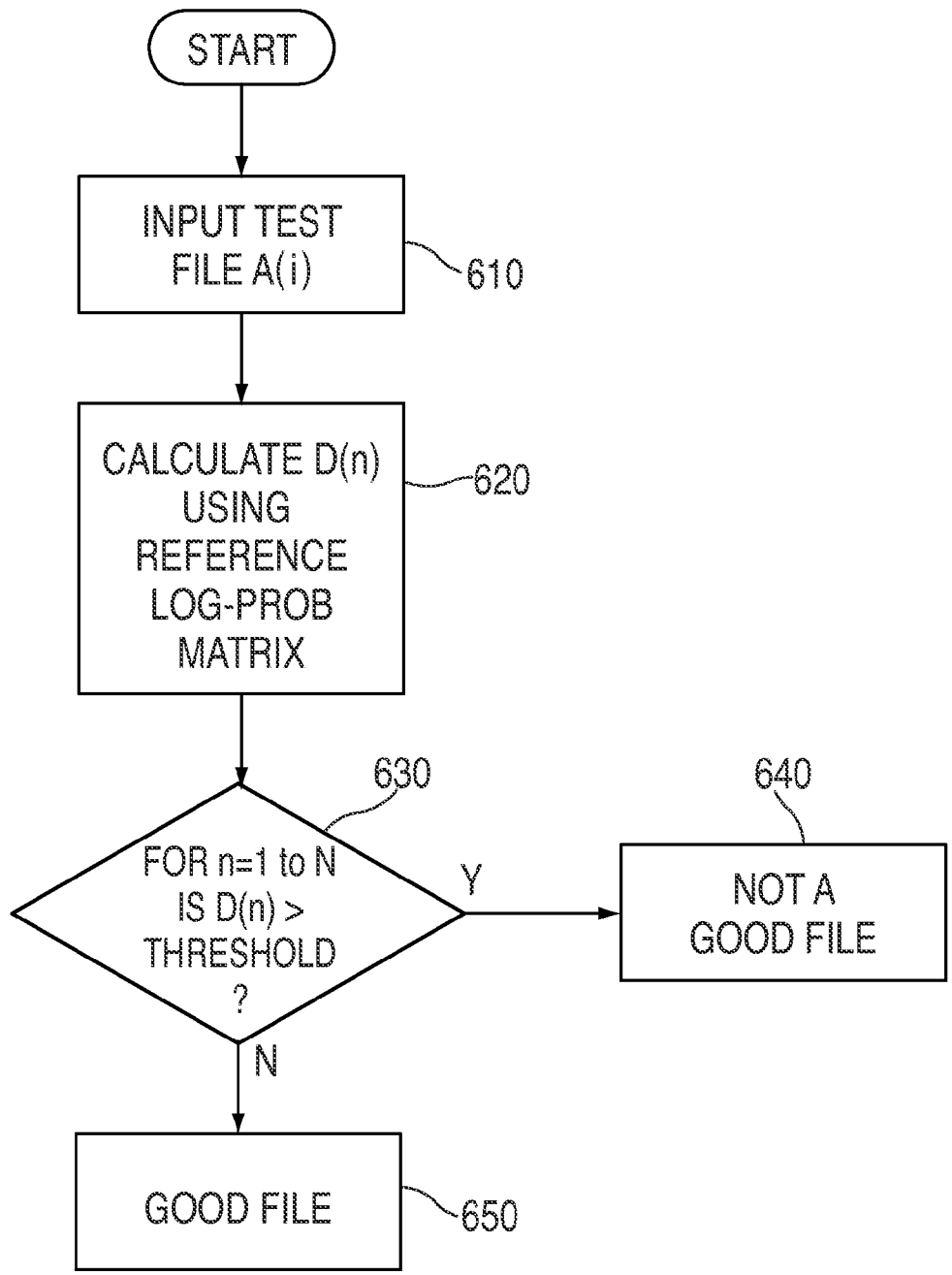
FIG. 6 is a flowchart illustrating a further embodiment of the present invention.

In a further embodiment shown in the flowchart of FIG. 6, the method and system of the present invention calculates a series of entropy density measurements on subdomains of a file under test, thereby creating an entropy density function D(n) where n represents each subdomain from n=0 to N−1 where N represents the number of subdomains within the file. In particular, as shown in FIG. 6, a test file A(i) is first input at step 610, the entropy density D(n) of A(i) is calculated at step 620 using a reference (pre-calculated) log-probability matrix L(j,k) for N subdomains of A(i) (i.e., sequential regions of predetermined size as discussed herein). Each value of the calculated entropy density function D(n) is then compared to the expected threshold at step 630. If the comparison shows that all of the calculated entropy density function values are less than the associated threshold for the reference log-probability matrix L(j,k), the comparison identifies the expected file type (i.e., the type of file used to generate the reference log-probability matrix) at step 650. If the comparison shows that any of the calculated entropy density function values is greater than the associated threshold for the reference log-probability matrix L(j,k), the processed file A(i) is of a type different from the file type used to create the reference log-probability matrix (step 640).

The method of FIG. 6 offers the advantage of separately testing specific regions of the file where embedded binary code might be found. As one of ordinary skill in the art will readily recognize, the subdomain over which each entropy density value is calculated must not be made too small, or naturally occurring statistical variation in the underlying data may produce noisy results.

For cases where an ASCII-encoded binary executable software module might be embedded in an otherwise legitimate ASCII file, the entropy measure interval (i.e., the fixed string length) is tailored to match the minimum expected length of executable code. One of ordinary skill in the art will readily recognize that a minimum length of an executable software module is several kilobytes, and that this size will be even greater when the executable software module is encoded in 7-bit ASCII characters. As a result, a measurement domain length of two kilobytes may be reasonably chosen as a lower limit for the subdomain size for the detection of embedded binary code in a string of ASCII characters otherwise containing English text.

The method shown in FIG. 6 is particularly suited for identifying embedded binary code within a string of ASCII characters otherwise containing English text. A log-probability matrix L is first generated for English text as discussed above with respect to FIG. 3. For example, as discussed above, the log-probability matrix L may be generated using a text file containing the collected works of Shakespeare. As an alternative, the log-probability matrix may be formed from a text file containing an entire English-language dictionary, e.g., the Oxford English Dictionary. The log-probability matrix L created in this way provides a reference file for entropy measurements on other files containing English text. As discussed above, the measured entropy density for the English text reference file using this log-probability matrix L is 2.42.

As discussed above, when a file containing random characters that are members of the 7-bit ASCII printable character set is processed based on a log-probability matrix L generated from that same file, the absolute entropy density is a known value of 4.61, see equation (7) and Table 1 above. However, the entropy density measurement when the log-probability matrix L is generated from an English text ASCII file will be much higher, as shown in Table 2 above, approximately 17.8. This is expected, because the log-probability matrix L generated from English text highlights the improbability of character pairs that are unusual in English text. The choice of a measurement threshold for deciding whether a file (or subdomain) is as expected (i.e., contains only English text) or is not as expected (i.e., contains encoded information that is not English text) must fall between these numerical extremes. As discussed below, a threshold value of 5 is preferably selected.

Table 3 summarizes the statistical character of tested entropy density measurements for English text using measurement domains of different size. As expected, smaller sized measurement domains result in noisy measurements and the identified measurement domain of two kilobytes provides a strong signal/noise ratio of approximately 1200 and an RMS value of roughly 0.07 units.

TABLE 3

| Domain Size (Bytes) | RMS | Signal to Noise Ratio | dB |
| --- | --- | --- | --- |
| 2 | 0.945 | 6.54 | 8.2 |
| 8 | 0.494 | 23.8 | 13.8 |
| 32 | 0.264 | 83.7 | 19.2 |
| 128 | 0.156 | 241 | 23.8 |
| 512 | 0.105 | 533 | 27.3 |
| 2048 | 0.0702 | 1187 | 30.7 |
| 8192 | 0.0436 | 3065 | 34.9 |

Figure 7:
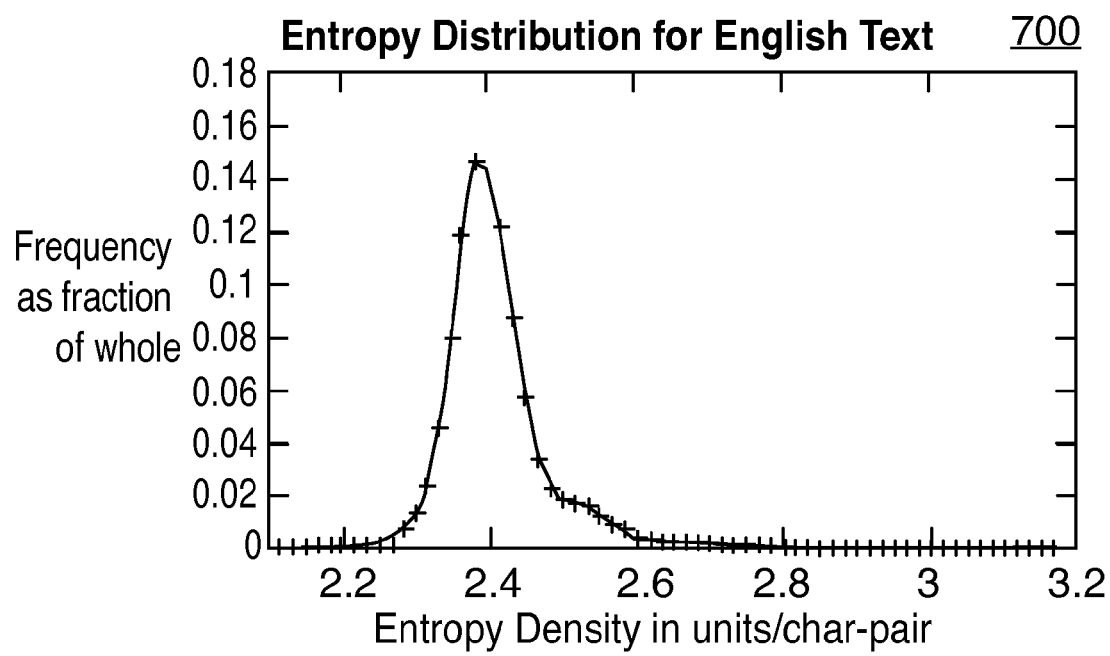
FIG. 7 is a histogram of measured entropy distribution for an English language ASCII text file.

Significantly, the distribution of entropy density values about the mean value is Normal (Gaussian) in appearance which suggests that departures from the mean entropy density value greater than six times the RMS value (deviations from mean value in excess of 0.4) are unlikely in the extreme. A histogram 700 of entropy density values for a domain size of 2048, scaled as a probability function, is shown in FIG. 7. The target file for this calculation was the previously referenced ASCII text containing the collected works of Shakespeare. In this testing, the lowest measured entropy density value (over the 2048 character domain) was 2.10 and the highest was 3.17.

Figure 8A:
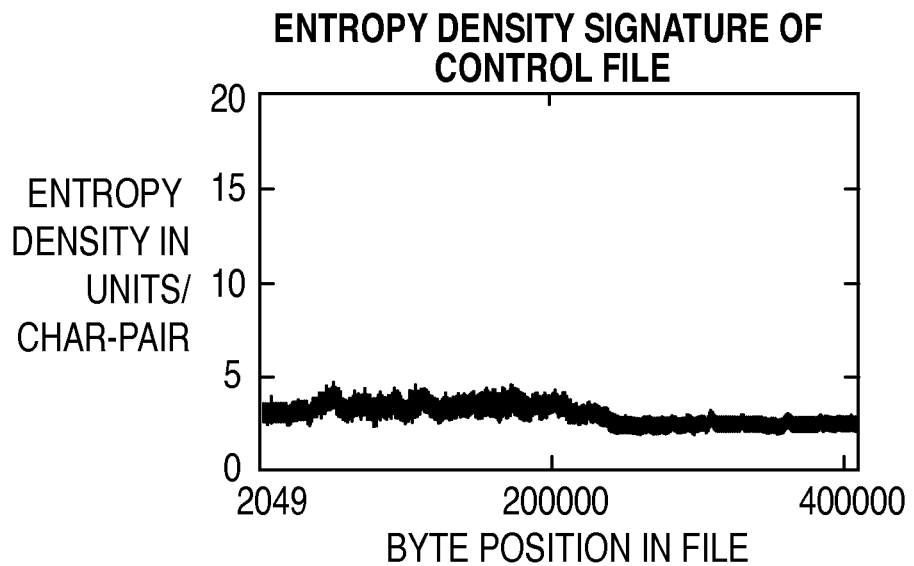
FIGS. 8A and 8B are graphs of test results obtaining using a method according to an embodiment of the present invention.
Figure 8B:
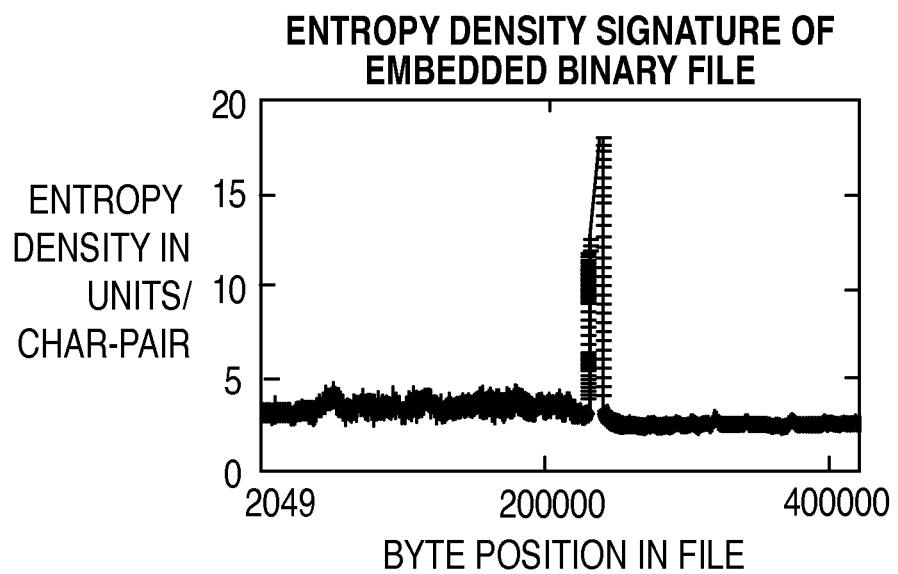

FIGS. 8A and 8B are graphs which show the results from using the method of FIG. 6 to test a file containing only English-language text (FIG. 8A) and a file consisting of English-language text with a binary-encoded executable file embedded therein (FIG. 8B). To generate the file having a binary-encoded executable file, a simple executable code module was first created in C code, compiled using the Gnu open-source compiler, and executed in the CYGWIN environment on a Dell laptop computer in order to verify its functionality. The size of the resulting executable file was 8.8 Kbyte. This executable file was then converted into base64 format using the base64 Unix utility included in the CYGWIN environment, which resulted in an file of size 11.9 Kbyte that contained essentially random 7-bit ASCII text. The base64 encoded executable file presented a measured entropy density of 11.6 units, using the log-probability matrix L generated from English text.

For the testing summarized in FIG. 8A, a composite file serving as a control file was created using an ASCII text file containing two different Shakespeare plays in series, but without insertion of the base64 executable file. As shown in FIG. 8A, processing of the control file by the method of FIG. 6 produced an entropy density throughout the entire file which fluctuates about a value of 3 and never rises above a value of 5.

For the testing summarized in FIG. 8B, the base64 executable file was appended to an ASCII text file containing the contents of the first Shakespeare play to create a composite test file. The second Shakespeare play was appended to the test file after the base64 encoded executable file. The resulting test file was 422 Kbyte in size and consisted of an executable code module rendered in base64 sandwiched between two legitimate blocks of English text. The test file differed in size from the control file by less than 3 percent. As shown in FIG. 8B, processing of the test file by the method of FIG. 6 produced an entropy density of about 3 for most of the file, except in the region where the base64 encoded executable file was embedded. In this region, the entropy density rises dramatically. As evident from FIGS. 8A and 8B, in using the method of FIG. 6, the measured entropy density can be compared with a threshold value of 5. If this threshold is exceeded by the measured entropy density, the file under test almost certainly contains encoded binary data. This application of the method of FIG. 6 is particularly suited for use in detecting embedded binary code hidden in English-language ASCII text files.

Figure 9:
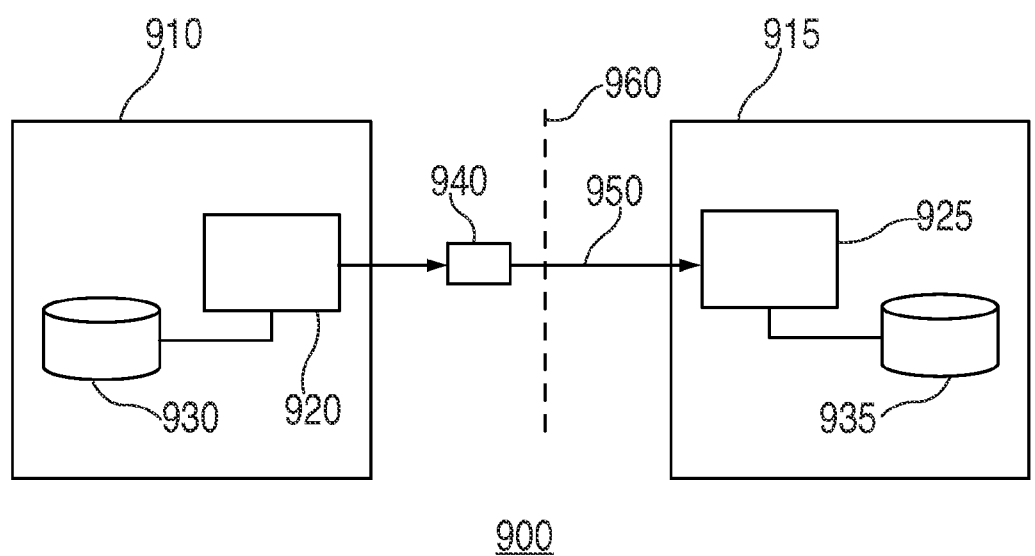
FIG. 9 is a block diagram illustrating an implementation of the present invention within a high-security data transfer system.

One particular application for the method of FIG. 6, as shown in FIG. 9, is as a data filter in high-security data transfer systems. In such systems, a lower security network 910 may be connected to a higher security network 915 via a network connection 950. Network connection 950 may be a one-way connection, so that data cannot move from the higher security network 915 to the lower security network 910, but the present invention is not limited to use on one-way network connections. A file to be transferred from a storage device 930 in the lower security network 910 to the higher security network 915 is transferred to network connection 950 by computing system 920. However, before the file can pass into the domain of the higher security network, as shown by the dotted lines 960 in FIG. 9, the file must be processed by a data filter 940 according to the present invention. If the file conforms to the expected results, the file is likely to be free of embedded encoded binary content and is transferred to computing system 925 for storage in storage device 935. However, if the file does not conform to the expected results, the file presents high risk of embedded encoded binary content and may be quarantined and not allowed to enter the domain of the higher security network 915. As one of ordinary skill in the art will readily recognize, the data filter 940 can be part of computing system 920 or part of computing system 925 or could be embedded within a repeater positioned along network connection 950. In any of such embodiments, data filter 940 may be part of a system which may include one or more processors, and program and data storage, such as memory, for storing program code executable on such processors, as well as various input/output devices and/or interfaces.

As discussed herein, the present invention may be used to recognize data encoding methods other than ASCII English text, including foreign language ASCII text and non-language files formed from a fixed set of possible information units such as characters. Furthermore, the present invention may be applied to any fixed set of data, e.g., complete files or packets forming a complete file, for processing.

The figures include block diagrams and flowchart illustrations of methods, apparatuses and computer program products according to an embodiment of the invention. It will be understood that each block in such figures, and combinations of these blocks, can be implemented by computer program instructions and/or rendered in electronic circuitry. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g., read only memory devices within a computer such as ROM or CD-ROM disks readable by a computer I/O attachment); (b) information alterably stored on writable storage media (e.g., floppy disks and hard drives); or (c) information conveyed to a computer through communication media for example using wireless, baseband signaling or broadband signaling techniques, including carrier wave signaling techniques, such as over computer or telephone networks via a modem. However, note that only non-transitory computer-readable media are within the scope of the present invention, where non-transitory computer-readable media comprise all computer-readable media except for a transitory, propagating signal.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A computer-implemented method for detecting unexpected file or packet types, comprising the steps of:
   receiving a file or packet to be tested, the file or packet formed from a sequential series of information units, each information unit within the file or packet included within a predetermined set of information units;
   computing a first information unit-pair entropy density measurement for the received file or packet using a first probability matrix which tabulates probabilities of occurrence for each possible sequential pair of information units of the predetermined set of information units; and
   comparing the first computed information unit-pair entropy density measurement with a threshold associated with a first expected file or packet type and determining whether the received file or packet is of an unexpected file or packet type or of the first expected file or packet type;
   wherein the information unit-pair entropy density measurement is calculated based on a relation between each sequential pair of information units within a received file or packet and a corresponding entry in the first probability matrix for such sequential pair of information units.

2. The computer-implemented method of claim 1, further comprising the step of generating the first probability matrix from the received file or packet prior to computing the first information unit-pair entropy density measurement.

3. The computer-implemented method of claim 1, wherein the first probability matrix is predetermined based on the first expected file or packet type.

4. The computer-implemented method of claim 1, further comprising the steps of, if the received file or packet is determined to be of an unexpected file or packet type:
   computing a second information unit-pair entropy density measurement for the received file or packet using a second probability matrix which tabulates probabilities of occurrence for each possible sequential pair of information units of the predetermined set of information units;
   comparing the second computed information unit-pair entropy density measurement with a threshold associated with a second expected file type and determining whether the received file or packet is of an unexpected file or packet type or of the second expected file or packet type.

5. The computer-implemented method of claim 1, wherein the computing step computes an information unit-pair entropy density measurement for each of a plurality of subdomains of the received file or packet and wherein the comparing step compares each information unit-pair entropy density measurement to the threshold to determine whether the received file or packet includes one or more subdomains corresponding to an unexpected file or packet type.

6. The computer-implemented method of claim 1, wherein the information units comprise characters, wherein the predetermined set of information units comprise a predetermined set of characters, and wherein the predetermined set of characters is the full set of American Standard Code for Information Interchange (ASCII) characters.

7. The computer-implemented method of claim 1, wherein the information units comprise characters, wherein the predetermined set of information units comprise a predetermined set of characters, and wherein the predetermined set of characters is the set of printable ASCII characters.

8. The computer-implemented method of claim 1, wherein the information units comprise characters, and wherein the first probability matrix is calculated from a file or packet consisting of the full set of ASCII characters.

9. The computer-implemented method of claim 1, wherein the information units comprise characters, and wherein the first probability matrix is calculated from a file or packet consisting of the set of printable ASCII characters.

10. The computer-implemented method of claim 1, wherein the information units comprise characters, and wherein the first expected file or packet type is English-language ASCII text and wherein the threshold is 3.2.

11. The computer-implemented method of claim 1, wherein the first information unit-pair entropy density measurement D is calculated according to the following equation:

$$D = -(1/N) \sum_{i=0}^{i<N-1} \ln(P(i, i+1))$$

where N is the total number of information units in the received file or packet and P(j, k) is the first probability matrix.

12. The computer-implemented method of claim 11, wherein the first probability matrix P(j, k) is calculated according to the following equation:

$$P(j,k) = M(j,k)/V(j)$$

where M(j, k) is a matrix where indices j, k represent a particular sequential combination of information unit values and matrix element values at each entry in the matrix represent a total number of instances of a particular information unit pair within the file or packet used to create the matrix and V(j) is a vector where an index j represents a particular information unit and having an element value representing a number of occurrences of information unit pairs whose leading information unit is information unit j.

13. The computer-implemented method of claim 1, wherein the first probability matrix is stored in memory as a first log-probability matrix L(j, k), and wherein the first information unit-pair entropy density measurement D is calculated according to the following equation:

$$D = (1/N) \sum_{i=0}^{i<N-1} L(i, i+1)$$

where N is the total number of information units in the received file or packet.

14. The computer-implemented method of claim 13, wherein the first log-probability matrix L(j, k) is calculated according to the following equation:

$$L(j,k) = -\ln(M(j,k)/V(j))$$

where M(j, k) is a matrix where the indices j, k represent a particular sequential combination of information unit values and the matrix element values represents the total number of instances of a particular information unit pair within the file or packet used to create the matrix and V(j) is a vector where an index j represents a particular information unit and having an element value representing a number of occurrences of information unit pairs whose leading information unit is information unit j.

15. The computer-implemented method of claim 1, wherein the information units comprise characters, and wherein the predetermined set of information units comprise a predetermined set of characters.

16. A system for detecting unexpected file or packet types, the system comprising:
a processor and a memory for storing program code, the program code comprising:
a program code portion configured to receive a file or packet to be tested, the file or packet formed from a sequential series of information units, each information unit within the file or packet included within a predetermined set of information units;
a program code portion configured to compute a first information unit-pair entropy density measurement for the received file or packet using a first probability matrix which tabulates probabilities of occurrence for each possible sequential pair of information units of the predetermined set of information units; and
a program code portion configured to compare the first computed information unit-pair entropy density measurement with a threshold associated with a first expected file or packet type and determining whether the received file or packet is of an unexpected file or packet type or of the first expected file or packet type;
wherein the processor is configured to execute the program code portions stored in the memory; and
wherein the information unit-pair entropy density measurement is calculated based on a relation between each sequential pair of information units within a received file or packet and a corresponding entry in the first probability matrix for such sequential pair of information units.

17. The system of claim 16, further comprising a program code portion stored in the memory and configured to generate the first probability matrix from the received file or packet prior to computing the first information unit-pair entropy density measurement.

18. The system of claim 16, wherein the first probability matrix is predetermined based on the first expected file or packet type.

19. The system of claim 16, further comprising:
a program code portion stored in the memory and configured to compute, if the received file or packet is determined to be of an unexpected file or packet type, a second information unit-pair entropy density measurement for the received file or packet using a second probability matrix which tabulates probabilities of occurrence for each possible sequential pair of information units of the predetermined set of information units; and
a program code portion stored in the memory and configured to compare the second computed information unit-pair entropy density measurement with a threshold associated with a second expected file or packet type and determine whether the received file or packet is of an unexpected file or packet type or of the second expected file or packet type.

20. The system of claim 16, wherein the program code portion configured to compute a first information unit-pair entropy density measurement is additionally configured to compute an information unit-pair entropy density measurement for each of a plurality of subdomains of the received file or packet and wherein the program code portion configured to compare is additionally configured to compare each information unit-pair entropy density measurement to the threshold to determine whether the received file or packet includes one or more subdomains corresponding to an unexpected file or packet type.

21. The system of claim 16, wherein the information units comprise characters, wherein the predetermined set of information units comprise a predetermined set of characters, and wherein the predetermined set of characters is the full set of American Standard Code for Information Interchange (ASCII) characters.

22. The system of claim 16, wherein the information units comprise characters, wherein the predetermined set of information units comprise a predetermined set of characters, and wherein the predetermined set of characters is the set of printable ASCII characters.

23. The system of claim 16, wherein the information units comprise characters, and wherein the first probability matrix is calculated from a file or packet consisting of the full set of ASCII characters.

24. The system of claim 16, wherein the information units comprise characters, and wherein the first probability matrix is calculated from a file or packet consisting of the set of printable ASCII characters.

25. The system of claim 16, wherein the information units comprise characters, and wherein the first expected file or packet type is English-language ASCII text and wherein the threshold is 3.2.

26. The system of claim 16, wherein the first information unit-pair entropy density measurement D is calculated according to the following equation:

$$D = -(1/N) \sum_{i=0}^{i<N-1} \ln(P(i, i+1))$$

where N is the total number of information units in the received file or packet and P(j, k) is the first probability matrix.

27. The system of claim 26, wherein the first probability matrix P(j, k) is calculated according to the following equation:

$$P(j,k) = M(j,k)/V(j)$$

where M(j, k) is a matrix where indices j, k represent a particular sequential combination of information unit values and matrix element values at each entry in the matrix represent a total number of instances of a particular information unit pair within the file or packet used to create the matrix and V(j) is a vector where an index j represents a particular information unit and having an element value representing a number of occurrences of information unit pairs whose leading information unit is information unit j.

28. The system of claim 16, wherein the first probability matrix is stored in memory as a first log-probability matrix L(j, k), and wherein the first information unit-pair entropy density measurement D is calculated according to the following equation:

$$D = (1/N) \sum_{i=0}^{i<N-1} L(i, i+1)$$

where N is the total number of information units in the received file or packet.

29. The system of claim 28, wherein the first log-probability matrix L(j, k) is calculated according to the following equation:

$$L(j,k) = -\ln(M(j,k)/V(j))$$

where M(j, k) is a matrix where the indices j, k represent a particular sequential combination of information unit values and the matrix element values represents the total number of instances of a particular information unit pair within the file or packet used to create the matrix and V(j) is a vector where an index j represents a particular information unit and having an element value representing a number of occurrences of information unit pairs whose leading information unit is information unit j.

30. The system of claim 16, wherein the information units comprise characters, and wherein the predetermined set of information units comprise a predetermined set of characters.

31. A non-transitory computer readable medium for storing computer implementable instructions for causing a computer system to perform a method for detecting unexpected file or packet types, the method comprising the steps of:
receiving a file or packet to be tested, the file or packet formed from a sequential series of information units, each information unit within the file or packet included within a predetermined set of information units;
computing a first information unit-pair entropy density measurement for the received file or packet using a first probability matrix which tabulates probabilities of occurrence for each possible sequential pair of information units of the predetermined set of information units; and
comparing the first computed information unit-pair entropy density measurement with a threshold associated with a first expected file or packet type and determining whether the received file or packet is of an unexpected file or packet type or of the first expected file or packet type;
wherein the information unit-pair entropy density measurement is calculated based on a relation between each sequential pair of information units within a received file or packet and a corresponding entry in the first probability matrix for such sequential pair of information units.

32. The non-transitory computer readable medium for storing computer implementable instructions for causing a computer system to perform a method for detecting unexpected file or packet types of claim 31, further comprising generating the first probability matrix from the received file or packet prior to computing the first information unit-pair entropy density measurement.

33. The non-transitory computer readable medium for storing computer implementable instructions for causing a computer system to perform a method for detecting unexpected file or packet types of claim 31, wherein the first probability matrix is predetermined based on the first expected file or packet type.

34. The non-transitory computer readable medium for storing computer implementable instructions for causing a computer system to perform a method for detecting unexpected file or packet types of claim 31, further comprising the steps of, if the received file or packet is determined to be of an unexpected file or packet type:
computing a second information unit-pair entropy density measurement for the received file or packet using a second probability matrix which tabulates probabilities of occurrence for each possible sequential pair of information units of the predetermined set of information units;
comparing the second computed information unit-pair entropy density measurement with a threshold associated with a second expected file or packet type and determining whether the received file or packet is of an unexpected file or packet type or of the second expected file or packet type.

35. The non-transitory computer readable medium for storing computer implementable instructions for causing a computer system to perform a method for detecting unexpected file or packet types of claim 31, wherein the computing step computes an information unit-pair entropy density measurement for each of a plurality of subdomains of the received file or packet and wherein the comparing step compares each information unit-pair entropy density measurement to the threshold to determine whether the received file or packet includes one or more subdomains corresponding to an unexpected file or packet type.

36. The non-transitory computer readable medium for storing computer implementable instructions for causing a computer system to perform a method for detecting unexpected file or packet types of claim 31, wherein the information units comprise characters, wherein the predetermined set of information units comprise a predetermined set of characters, and wherein the predetermined set of characters is the full set of American Standard Code for Information Interchange (ASCII) characters.

37. The non-transitory computer readable medium for storing computer implementable instructions for causing a computer system to perform a method for detecting unexpected file or packet types of claim 31, wherein the information units comprise characters, wherein the predetermined set of information units comprise a predetermined set of characters, and wherein the predetermined set of characters is the set of printable ASCII characters.

38. The non-transitory computer readable medium for storing computer implementable instructions for causing a computer system to perform a method for detecting unexpected file or packet types of claim 31, wherein the information units comprise characters, and wherein the first probability matrix is calculated from a file or packet consisting of the full set of ASCII characters.

39. The non-transitory computer readable medium for storing computer implementable instructions for causing a computer system to perform a method for detecting unexpected file or packet types of claim 31, wherein the information units comprise characters, and wherein the first probability matrix is calculated from a file or packet consisting of the set of printable ASCII characters.

40. The non-transitory computer readable medium for storing computer implementable instructions for causing a computer system to perform a method for detecting unexpected file or packet types of claim 31, wherein the information units comprise characters, and wherein the first expected file or packet type is English-language ASCII text and wherein the threshold is 3.2.

41. The non-transitory computer readable medium for storing computer implementable instructions for causing a computer system to perform a method for detecting unexpected file or packet types of claim 31, wherein the first information unit-pair entropy density measurement D is calculated according to the following equation:

$$D = -(1/N) \sum_{i=0}^{i<N-1} \ln(P(i, i+1))$$

where N is the total number of information units in the received file or packet and P(j, k) is the first probability matrix.

42. The non-transitory computer readable medium for storing computer implementable instructions for causing a computer system to perform a method for detecting unexpected file or packet types of claim 41, wherein the first probability matrix P(j, k) is calculated according to the following equation:

$$P(j,k)=M(j,k)/V(j)$$

where M(j, k) is a matrix where indices j, k represent a particular sequential combination of ASCII information unit values and matrix element values at each entry in the matrix represent a total number of instances of a particular information unit pair within the file or packet used to create the matrix and V(j) is a vector where an index j represents a particular ASCII information unit and having an element value representing a number of occurrences of information unit pairs whose leading information unit is information unit j.

43. The non-transitory computer readable medium for storing computer implementable instructions for causing a computer system to perform a method for detecting unexpected file or packet types of claim 31, wherein the first probability matrix is stored in memory as a first log-probability matrix L(j, k), and wherein the first information unit-pair entropy density measurement D is calculated according to the following equation:

$$D = (1/N) \sum_{i=0}^{i<N-1} L(i, i+1)$$

where N is the total number of information units in the received file or packet.

44. The non-transitory computer readable medium for storing computer implementable instructions for causing a computer system to perform a method for detecting unexpected file or packet types of claim 43, wherein the first log-probability matrix L(j, k) is calculated according to the following equation:

$$L(j,k)=-\ln(M(j,k)/V(j))$$

where M(j, k) is a matrix where the indices j, k represent a particular sequential combination of ASCII information unit values and the matrix element values represents the total number of instances of a particular information unit pair within the file or packet used to create the matrix and V(j) is a vector where an index j represents a particular ASCII information unit and having an element value representing a number of occurrences of information unit pairs whose leading information unit is information unit j.

45. The non-transitory computer readable medium for storing computer implementable instructions for causing a computer system to perform a method for detecting unexpected file or packet types of claim 31, wherein the predetermined set of information units comprise a predetermined set of characters.

* * * * *